United States Patent [19]

Sakai

[11] 4,024,529
[45] May 17, 1977

[54] IMAGE DISPLAY DEVICE

[75] Inventor: Tetsuo Sakai, Tokyo, Japan

[73] Assignee: Nippon Hoso Kyokai, Tokyo, Japan

[22] Filed: June 11, 1974

[21] Appl. No.: 478,272

[52] U.S. Cl. .......................... 340/324 M; 358/240; 315/169 TV; 340/166 EL

[51] Int. Cl.² .......................................... H01J 17/48

[58] Field of Search ............... 340/324 M, 166 EL; 315/169 R, 169 TV; 178/7.3 D

[56] References Cited

UNITED STATES PATENTS

| | | | |
|---|---|---|---|
| 3,559,190 | 1/1971 | Bitzer et al. | 340/324 M |
| 3,627,924 | 12/1971 | Fleming et al. | 178/7.3 D |
| 3,733,435 | 5/1973 | Chodil et al. | 315/169 TV |
| 3,742,483 | 6/1973 | Ogle | 178/7.3 D |
| 3,883,778 | 5/1975 | Kaji et al. | 178/7.3 D |

Primary Examiner—David L. Trafton

Attorney, Agent, or Firm—Stevens, Davis, Miller & Mosher

[57] ABSTRACT

An image display device, particularly a gas discharge image display device comprising a plurality of display elements arranged in a matrix at every picture element and a plurality of driving circuits, the display elements being composed of either radiating elements or light quantity control elements, the voltage of a gradually varying waveform such as a saw-tooth waveform being supplied to a common bus connected to the emitters of semiconductors such as FETs, bipolar transistors or the like which provide the driving circuit for controlling currents flowing through the display elements, the level whereby the driving current is clipped being continuously varied so as to control effectively the currents flowing through the display elements, and the currents being subjected to one of amplitude modulation and a combination of amplitude modulation and duty time modulation in accordance with the level of the image signal.

10 Claims, 8 Drawing Figures

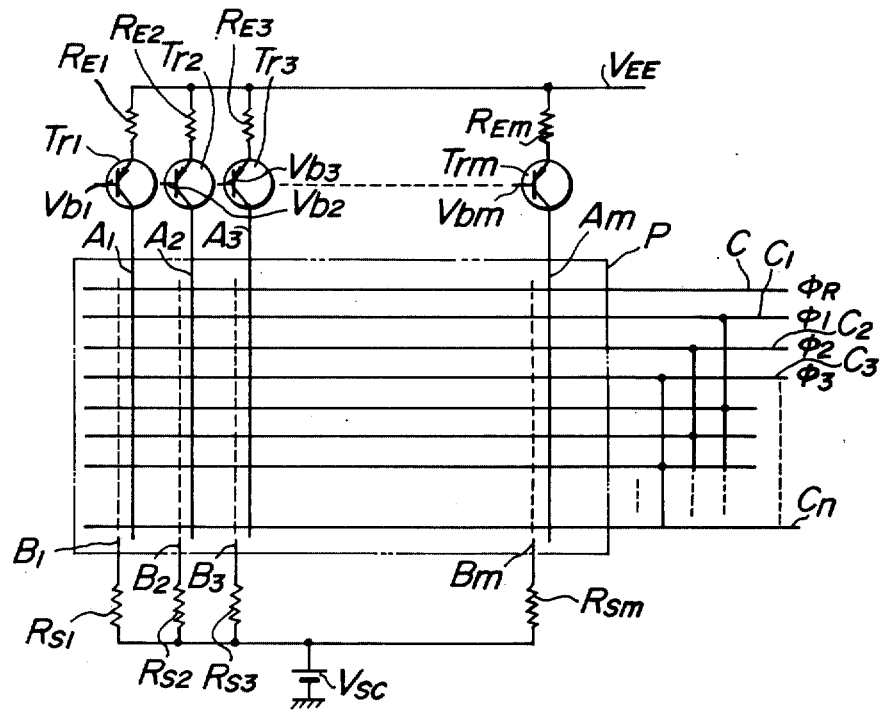
FIG.1
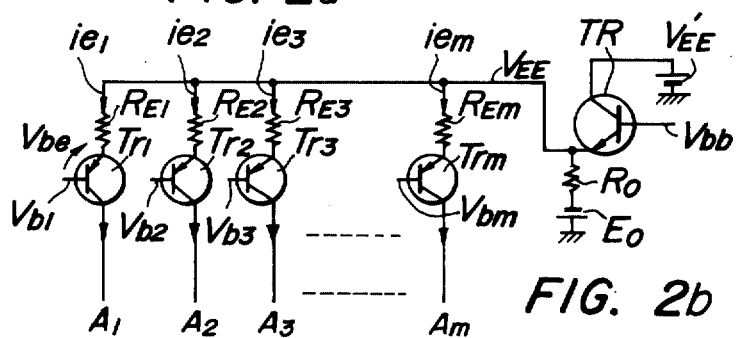
FIG. 2a
FIG. 2b
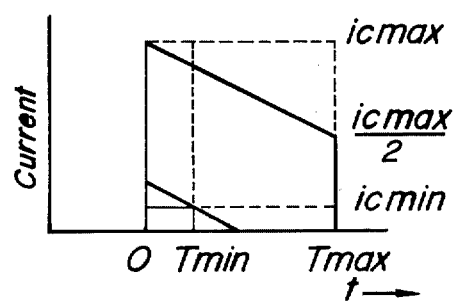
FIG_5
FIG. 2c
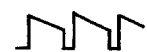

IMAGE DISPLAY DEVICE

BACKGROUND OF THE INVENTION

1. Field of the Invention:

The present invention relates to a luminance modulation system for a DC type image display device wherein radiating elements or light quantity control elements are matrix-arranged at each picture element for composing an image.

2. Description of the Prior Art:

An image display device of such matrix display type has various problems in performance, and one of the problems is an insufficient contrast of the image to be displayed. It is cuased by a deficiency of the highest luminance which can be displayed by such a device, but according to the experiment carried by the present inventor, it has been found that this insufficient contrast is particularly remarkable in an image display device using a gas discharge cell as a radiating element, because, in the gas discharge cell, the lowest luminance is determined by the minimum discharge current necessary for maintaining the discharge in a conventional driving system. Moreover, in the gas discharge cell, this minimum discharge current becomes fairly large and the luminance of the image displayed by this mininum discharge current becomes considerably high, so that the contrast ratio of the lowest luminance to the highest luminance cannot make a sufficiently large value. In order to increase this contrast ratio, various methods have been considered and one of them is a method of lowering the lowest luminance to be displayed by controlling the operating time of the radiating element or the light quantity control element for composing a picture element. If this method is applied to the image display device of the gas discharge type merely as it is, the instant of starting the discharge in the discharge cell is delayed and in case of displaying the image by the gas discharge, at least a time for maintaining the discharge which is larger than the delay time is required, so that the ratio of the minimum discharge time to the maximum discharge time, i.e., the contrast ratio, cannot sufficiently be made large.

As to the image display device of the gas discharge type, the present inventor has previously proposed a method of increasing a contrast ratio of the image to be displayed by duty time-modulating a discharge current of the gas discharge cell in a low luninance region and by amplitude-modulating, i.e., level-modulating it in a high luninance region, but in this method, it is necessary to provide two systems of a duty time-modulation circuit and an amplitude modulation circuit as a circuit for driving the discharge cell, either one of both modulation circuits being operated in accordance with the level of an image signal. Besides, it is required that the highest level of the output of the duty time-modulation circuit operated for the low luminance region coincides precisely with the lowest level of the output of the amplitude modulation circuit operated for the highest luminance region. If not so, the luminance characteristics of the image displayed by the gas discharge cell become discontinuous before and after switching these two modulation circuits with each other, and when the image signal is varied from the low level to the high level, the luminance of the discharge cell is sometimes varied in the darker direction. In this method as described above, the modulation circuits of two systems are required, and a switching circuit is also required for automatically selecting either one of these two systems in accordance with the level of the image signal, so that the construction of the whole circuit for driving the discharge cell becomes very complicated. Consequently unevenness of the characteristics at every driving channel is increased and the picture quality of the displayed image is lowered by shading of the radiation.

SUMMARY OF THE INVENTION

In view of the foregoing, an object of the present invention is to duty time-modulate and level-modulate a discharge current in a gas discharge cell by using only one system of a modulation circuit similar to a conventional amplitude-modulation circuit without providing the duty time-modulation circuit and the amplitude-modulation circuit separately as described above for increasing a contrast ratio of an image to be displayed by an image display device.

Another object of the present invention is to prevent the discontinuity of the luminance characteristics of the gas discharge cell in accordance with a level of an image signal.

A further object of the present invention is to simplify the whole construction of a circuit for driving the discharge cell.

The image display device according to the present invention comprising radiating elements or light quantity control elements matrix-arranged at each picture element for composing an image, any one of a level modulation and a combination of a radiating duty time-modulation and amplitude modulation is selectively carried out for the control of the light quantity of display elements in accordance with the amplitude of an image signal, provided that the image signal is applied to a driving signal input terminal of a circuit for periodically driving the radiating element or the light quantity control element and a voltage gradually varied in a driving period is applied to a power source terminal of the driving circuit, respectively.

BRIEF DESCRIPTION OF THE DRAWINGS

FIG. 1 is a diagram showing the fundamental construction of a self-scanning type image display device used for explaining an embodiment of the present invention;

FIG. 2a is a circuit diagram showing one embodiment of a driving circuit of the image display device according to the present invention;

FIG. 2b is a graph showing a waveform of the signal applied to the bases of the controlling transistors in the conventional device;

FIG. 2c is a graph showing a waveform of the signal applied to the bases of the controlling transistors in the device according to the present invention;

FIG. 5 is a diagram showing the amount of the discharge current flowing through the discharge cell for examining the effect of the modulation system according to the present invention.

DESCRIPTION OF THE PREFERRED EMBODIMENT

Figure 3A:
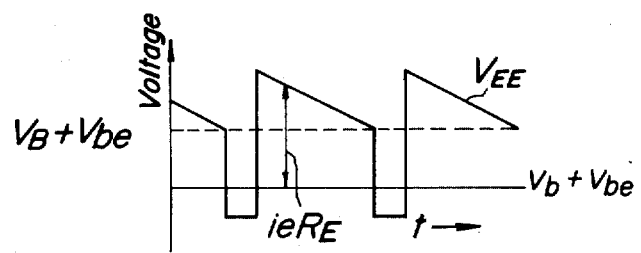
FIGS. 3a and 3b are graphs for explaining the operation of the device according to the present invention.

FIG. 1 shows the fundamental construction of a self-scanning type gas discharge image display device used for explaining an embodiment of the present invention. In this image display device, in order to drive an image display panel P provided with display anodes $A_1$, $A_2$, $A_3$, ..., $A_m$, scanning anodes $B_1$, $B_2$, $B_3$, ... $B_m$, and a reset cathode C and cathodes $C_1$, $C_2$, $C_3$, ..., $C_n$ of each discharge cell, image signal voltages $V_{b1}$, $V_{b2}$, $V_{b3}$, ..., $V_{bm}$ are supplied to the display anodes $A_1$, $A_2$, $A_3$, ..., $A_m$, respective through transistors $T_{r1}$, $T_{r2}$, $T_{r3}$, ..., $T_{rm}$ amplifying these voltages and driving discharge cells. On the other hand, a constant voltage $V_{sc}$ is supplied from a direct current source to the scanning anodes $B_1$, $B_2$, $B_3$, ..., $B_m$ through series resistors $R_{s1}$, $R_{s2}$, $R_{s3}$, ..., $R_{sm}$, respectively, and three phase clock pulses $\phi_1$, $\phi_2$ and $\phi_3$ are successively supplied to the cathodes $C_1$, $C_2$, $C_3$, ..., $C_n$, respectively, so tat scanning of the picture elements can be carried out. Furthermore, a reset pulse $\phi_R$ is applied to the reset cathode C and thus scanning is started.

In FIG. 1, a constant DC voltage $V_{EE}$ is supplied to the emitters of the driving transistors $T_{r1}$, $T_{r2}$, $T_{r3}$, ..., $T_{rm}$ through emitter resistors $R_{E1}$, $R_{E2}$, $R_{E3}$, ..., $R_{Em}$, respectively, from a common bus, and usually on this DC voltage $V_{EE}$, blanking signal voltages are superimposed as shown in FIG. 2b.

FIG. 2a shows a circuit diagram in detail of one embodiment of his portion shown in FIG. 1. FIG. 2a, the blanking signal $V_{bb}$ is supplied to the base of a control transistor TR controlling the supply voltage $V'_{EE}$ so that the voltage superimposed with the blaning signal is obtained on a common bus of the output of the transistor TR and is supplied to the driving transistors $T_{r1}$, $T_{r2}$, $T_{r3}$, ..., $T_{rm}$. A resistor $R_0$ is a bias resistor and a DC power source $E_0$ is an electric power source of for operating the control transistor TR. In the circuit shown in FIG. 2a, only the blanking signal shown in FIG. 2b is usually applied to the base of the control transistor TR, but in the present invention, a signal having the waveform gradually varied in the driving period excepting the blanking period ( in the present embodiment, a gradually decreased sawtooth signal), is applied to the base of the transistor TR, so that the voltage $V_{EE}$ having the waveform similar to the sawtooth signal as shown in FIG. 2c, is obtained at the emitter of the control transistor TR, and is used as a source voltage for the driving transistors $T_{r1}$, $T_{r2}$, $T_{r3}$, ..., $T_{rm}$.

Obviously from the above explanation, the driving transistors $T_{r1}$, $T_{r2}$, $T_{r3}$, ..., $T_{rm}$ are not only operated as circuit elements of an amplitude modulation circuit for modulating an amplitude, i.e., a level of a discharge current flowing through the discharge cell, but are supplied with the power source voltage gradually varied in the driving period, so tat both of the clipping level and the duty time of the discharge current flowing through the discharge cell are varied, and consequently the amplitude-modulation and a combination of amplitude modulation and duty time-modulation are switched to each other, in accordance with the level of the image signal. The above described operation will be explained in detail hereinafter.

Figure 3B:
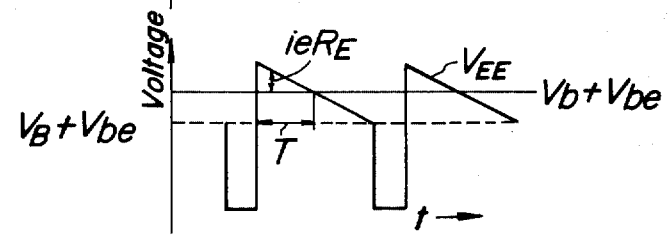

The image signal voltages $V_{b1}$, $V_{b2}$, $V_{b3}$, ..., $V_{bm}$ are supplied respectively to each base of the driving transistors $T_{r1}$, $T_{r2}$, $T_{r3}$, ..., $T_{rm}$ in such a manner that the voltage is lower as the image is brighter, i.e., in the negative polarity. FIGS. 3a and 3b show waveforms explaining the operation of the driving transistor $T_r$ in case of the low image signal voltage (bright image) and of the high signal voltage (dark image), respectively. In addition, a current $i_e$ flowing through the driving transistor $T_r$ is varied in accordance with the image signal voltage $V_b$ applied to the base thereof. In case that $V_{EE}-(V_b+V_{be}) \geqq 0$ (bright image)

$$i_e = V_{EE}-(V_b+V_{be})/R_E \tag{1}$$

In case that $V_{EE}-(V_b+V_{be}) < 0$ (dark image)

$$i_e = 0 \tag{2}$$

wherein $V_{be}$ represents a voltage between the base and the emitter of the driving transistor $T_r$. As shown in FIG. 3a, when the image signal voltage $v_b$ is low (bright image), $V_b + V_{be}$ (the potential of the emitter of the driving transistor $T_r$) becomes low, so that the voltage $i_e R_E$ across the emitter resistor $R_e$ becomes high. As a result, the current $i_e$ flowing through the transistor $T_r$ becomes larger according to the equation (1) and the luminance of the discharge cell becomes higher. Until the image signal voltage $V_b$, varying to a higher level (darker image), arrives at a specific value $V_b$, and the emitter potential $V_b+V_{be}$ coincides with the minimum value $V_B+V_{be}$ of the voltage $V_{EE}$ gradually varied (indicated by dotted lines), the level of the discharge current $i_e$ flowing through the discharge cell is varied in accordance with the level of the image signal voltage $V_b$, so as to perform the amplitude modulation. If the image signal voltage $V_b$ becomes higher than the specific value $V_B$ resulting in the state shown in FIG. 3b, the discharge current $i_e$ flows only during a period (shown by T) in which the potential $V_b V_{be}$ does not exceed the gradually varying voltage $V_{EE}$ as is apparent from the equations (1) and (2). Accordingly, in this case, the discharge current $i_e$ flows through the discharge cell by the amount corresponding to the potential $V_b+V_{be}$ only during the above described period T, so that both of the duty time and the clipping level of the discharge current continuously vary and the duty time-modulation and the amplitude modulation are simultaneously carried out.

As is apparent from FIGS. 3a and 3b the image to be displayed can be darkened to the very low luminance corresponding to a residual discharge current at an instant determined by the maximum value of the power source voltages $V_{EE}$ of the driving circuit.

Figure 4:
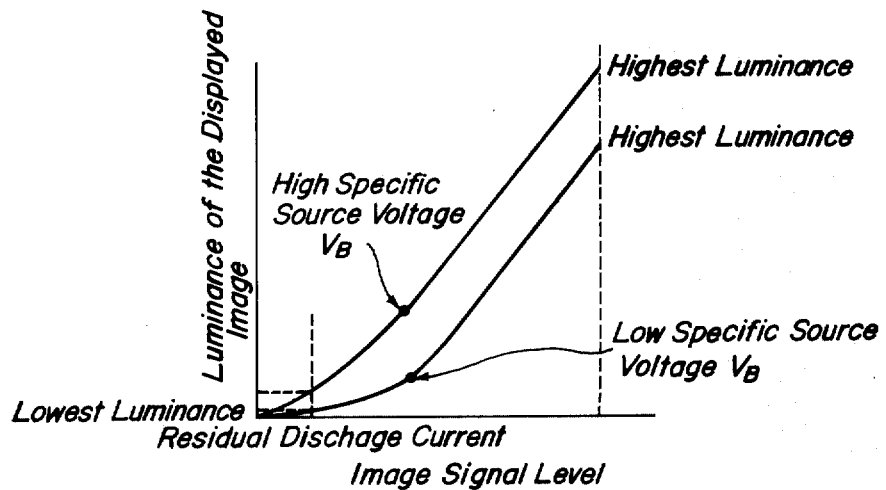
FIG. 4 is a graph showing the relation between the image signal voltage and the luminance of a displayed image in case of applying the luminance modulation system according to the present invention to the gas discharge type image display device.

In addition, in case of applying the luminance modulation system according to the present invention to the gas discharge type image display device, the relation between the image signal voltage and the luminance of the displayed image, as shown in FIG. 4, is linearly varied in the higher luminance region beyond the boundary of the image signal level corresponding to the specific value $V_B$ of the power source voltage $V_{EE}$ of the driving circuit, while this relation is varied along a square curve in the lower luminance region beyond the boundary. However, according to the grade of the gradual variation of the power source voltage $V_{EE}$ (a slope of the waveform in case of the saw-tooth wave), i.e., the selection of the aforementioned specific value $V_B$, the highest luminance to be displayed is lowered to some extent as compared with the case of the conventional constant power source voltage by lowering the power source voltage $V_{EE}$ during the driving period, but the minimum luminance corresponding to the aforementioned residual discharge current is much more lowered, so that the contrast ratio of the image to be displayed is remarkably increased. Therefore, the specific value $V_B$ of the power source voltage $V_{EE}$ of the aforementioned driving circuit must be selected in the optimum condition by taking both of the highest luminance and the contrast ratio into consideration.

Thus, according to the present invention, in the aforementioned image display device formed without using both of the duty time-modulation circuit and the amplitude-modulation circuit composed separately as usual and provided with only a circuit composed similar to a conventional amplitude modulation circuit, a light quantity of the discharge cell and the like for composing a picture element is amplitude modulated for the bright portion of the image, and the amplitude modulation and the duty time-modulation are simultaneously carried out in combination for the dark portion, and thus the contrast ratio of the highest luminance to the lowest luminace of the image to be displayed can be made remarkably larger than in the conventional one.

Then, in order to examine an effect of increasing the contrast ratio according to the present invention, the contrast ratios of the images compared between in case of either the conventional amplitude modulation only or the conventional duty time-modulation only, and in case of combining both of them according to the present invention, are calculated. As to the gas discharge cell, supposing that the minimum discharge current is $i_c$ min, the maximum discharge current $i_c$ max, the minimum discharge time required to build-up the discharge T min, and the maximum discharge time T max, the radiation quantity of the discharge cell is roughly expressed by the product of the discharge current and the discharge time, so that the contrast ratio $C_A$ in case of the amplitude modulation only becomes as follows.

$$C_A = \frac{i_c \max \cdot T \max}{i_c \min \cdot T \max} = \frac{i_c \max}{i_c \min} \quad (3)$$

The contrast ratio $C_W$ in case of the duty time-modulation only becomes as follows.

$$C_W = \frac{i_c \max \cdot T \max}{i_c \max \cdot T \min} = \frac{T \max}{T \min} \quad (4)$$

Supposing that the power source voltage $V_{EE}$ applied to the driving transistor is gradually varied as described above, so that the discharge current $i_c$ is gradually decreased from the value of the initial current $i_c$ max to the half value $i_c$ max/2 of the initial current during the driving period as shown in FIG. 5, the contrast ratio $C_M$ in case of the present invention is obtained as follows.

$$C_M = \frac{\frac{3}{4} i_c \max \cdot T \max}{2 i_c \min \cdot T \min} \quad (5)$$

As to the discharge current and the discharge current and the discharge time, supposing that $i_c$ min = 0.1 mA, $i_{c,max}$ = 2 mA, T min = 2 μsec and T max = 50 μsec, the above-mentioned contrast ratios $C_A$, $C_W$ and $C_M$ are obtained by the equations (3), (4) and (5), respectively, as follows.

$$C_A = 20 \quad (3)'$$

$$C_W = 25 \quad (4)'$$

$$C_M \sim 190 \quad (5)'$$

Consequently, it is understood that the contrast ratio of the displayed image is considerably increased in case of using the system of the present invention as compared with the conventional ones.

Further, in case of carrying out the system of the present invention, a relation (graduation) between the input image signal and the light quantity of the picture element does not graduate linearly from the region of the bright image wherein the light quantity of the picture element is amplitude modulated to the region of the dark image wherein the amplitude modulation and the duty time-modulation are simultaneously carried out, but the gradation is varied along almost the square curve within the range where the amplitude modulation and the duty time-modulation are simultaneously carried out. Accordingly, the gradation of the image signal is previously corrected before the image signal is supplied to the base of the driving transistor, if necessary, or the waveform of the gradually varied source voltage $V_{EE}$ of the driving circuit is not made into a saw-tooth waveform as in the foregoing embodiment, but made into a gradually curved waveform, so that throughout all stages from the image signal input terminal to the image display panel, the linearity correction relating to the gradation of the image to be displayed is afforded. In addition, it is preferable in the parallel scanning type image display device composed of matrix-arranged display elements, such as a self-scanning type image display device, to carry out the linearity correction before converting the time sequential image signal to the simultaneous one.

The present invention is not restricted to the aforementioned embodiment, but can be modified variously, For example, as to the power source voltage $V_{EE}$ for the driving transistor any of gradually varying voltages can be used, so that if a relation between the display period and the pause period in the driving period is inversed, contrary to the abovementioned embodiment, a gradually increasing voltage can be used as the voltage $V_{EE}$. In addition, the luminace modulation system according to the present invention can be applied not only to the image display composed of matrix-arranged gas discharge cells, but also to the image display device composed of any matrix-arrangement of radiating elements such as luminescent diodes, or of light quantity control elements such as liquid crystal cells. Further, the semiconductor element or the circuit construction thereof used in the driving circuit of these image display elements is not restricted to the above described embodiment, but as to semiconductor elements, not only bipolar transistors but also field effect transistors (FET) can be used. Furthermore, as to the circuit construction, for example, the blanking signal is not necessarily superimposed on the power source voltage of the driving transistor, but can be supplied directly to the base of the driving transistor.

What is claimed is:
1. A DC image device comprising:
  a plurality of driving circuits each having a modulation signal input terminal for receiving an input signal and a source input terminal for receiving a source voltage, each of said driving circuits pro- ducing a driving current in response to said input image signal;

a plurality of display elements arranged in the form of a matrix for receiving said driving currents from said plurality of driving circuits, respectively, each of said display elements luminescing in accordance with its respective driving current; and means for generating said source voltage, said source voltage including first and second portions, said first portion having first and second voltage levels at the beginning and at the end thereof, respectively, the voltage level decreasing with time from said first voltage level to said second voltage level during said first portion, the voltage level during said second portion being less than said second voltage level; the driving currents produced by said plurality of driving circuits being subjected to only amplitude modulation when the magnitude of said input image signal is less than said second voltage level and to a combination of amplitude and duty time modulation when the magnitude of said input image signal is greater than said second voltage level and less than said first voltage level.

2. A DC image display device as claimed in claim 1, wherein each of said driving circuits comprises a driving transistor having first, second and third electrodes, and a resistor connected between said source input terminal and the second electrode of said transistor, said first electrode receiving said input image signal and said third electrode supplying said driving current to the corresponding display element.

3. A DC image display device as claimed in claim 2, wherein said driving transistors are bipolar transistors.

4. A DC image display device as claimed in claim 2, wherein said driving transistors are field effect transistors.

5. A DC image display device as claimed in claim 2, wherein said display elements are composed of gas discharge cells.

6. A DC image display device as claimed in claim 2, wherein said source voltage generating means comprises a control transistor having first, second and third electrodes, said first electrode receiving a signal having a waveform corresponding to that of said source voltage, said second electrode receiving a constant voltage corresponding to said first voltage level and said third electrode supplying said source voltage to said plurality of driving circuits.

7. A DC image display device as claimed in claim 1, wherein said source voltage generating means comprises a control transistor having first, second and third electrodes, said first electrode receiving a signal having a waveform corresponding to that of said source voltage, said second electrode receiving a constant voltage corresponding to said first voltage level and said third electrode supplying said source voltage to said plurality of driving circuits.

8. A DC image display device as claimed in claim 7, wherein said voltage decreasing with time is a voltage signal having a sawtooth waveform in which the voltage level continuously decreases during the first portion.

9. A DC image display device as claimed in claim 7, wherein said voltage decreasing with time is a voltage signal having a sawtooth waveform in which the voltage level decreases linearly during the first portion.

10. A DC image display device as claimed in claim 1, wherein the second portion of said source voltage comprises a blanking signal.

* * * * *